(12) United States Patent
Hartung

(10) Patent No.: US 12,551,697 B2
(45) Date of Patent: Feb. 17, 2026

(54) CIRCUIT FOR A LEAD OF AN IMPLANTABLE MEDICAL DEVICE

(71) Applicant: Saluda Medical Pty Limited, Artarmon (AU)

(72) Inventor: Dirk Hartung, Artarmon (AU)

(73) Assignee: Saluda Medical Pty Ltd, Macquarie Park (AU)

( * ) Notice: Subject to any disclaimer, the term of this patent is extended or adjusted under 35 U.S.C. 154(b) by 993 days.

(21) Appl. No.: 17/766,188

(22) PCT Filed: Oct. 1, 2020

(86) PCT No.: PCT/AU2020/051053
§ 371 (c)(1),
(2) Date: Apr. 1, 2022

(87) PCT Pub. No.: WO2021/062479
PCT Pub. Date: Apr. 8, 2021

(65) Prior Publication Data
US 2023/0132600 A1  May 4, 2023

(30) Foreign Application Priority Data
Oct. 4, 2019  (AU) ................................ 2019903743

(51) Int. Cl.
*A61N 1/08* (2006.01)
*A61N 1/05* (2006.01)

(52) U.S. Cl.
CPC .............. *A61N 1/086* (2017.08); *A61N 1/05* (2013.01)

(58) Field of Classification Search
CPC .................... A61N 1/086; A61N 1/05

USPC .......................................... 607/116
See application file for complete search history.

(56) References Cited

U.S. PATENT DOCUMENTS

| 5,217,010 A | * | 6/1993 | Tsitlik ............... | G01R 33/5673 |
| | | | | 607/9 |
| 8,989,840 B2 | | 3/2015 | Przybyszewski et al. | |

FOREIGN PATENT DOCUMENTS

AU    2014253481    11/2014

OTHER PUBLICATIONS

Australian Patent Office, International Search Report and Written Opinion, PCT/AU2020/051053, | Nov. 10, 2020, 10 pages.

(Continued)

*Primary Examiner* — Nadia A Mahmood
(74) *Attorney, Agent, or Firm* — Barnes & Thornburg LLP

(57) ABSTRACT

This disclosure relates to an implantable electric circuit (300) for medical stimulation The circuit comprises a plurality of capacitors (301) and a network of resistors (302). Each of the plurality of capacitors (301) is configured to couple radio frequency energy from one of a plurality of electrically conductive filaments (5) of a lead to the network of resistors (302). Further, the network of resistors (302) is configured to connect the plurality of capacitors (301) together to dissipate the radio frequency energy between the plurality of electrically conductive filaments. The network of resistors dissipates the energy between the filaments, which reduces negative impacts for the patient when subjected to MRI imaging. Further, no ground is required and as a result, the circuit can be placed into a header of an implantable pulse generator or into the lead itself.

13 Claims, 6 Drawing Sheets

(56) References Cited

OTHER PUBLICATIONS

Amanda Ison, Protecting Implantable Medical Devices From Electromagnetic Interference—European Passive Components Institute, Sep. 24, 2019, 6 pages.

Steven McCabe et al., A Novel Implant Electrode Design Safe in the RF Field of MRI Scanners, Department of Engineering, The University of Waikato, Dec. 28, 2016, 7 pages.

Steven McCabe et al., Electromagnetic Techniques to Minimize the Risk of Hazardous Local Heating Around Medical Implant Electrodes During Scanning, Department of Engineering, The University of Waikato, 4 pages.

Steven McCabe et al., Cause and Amelioration of MRI-Induced Heating Through Medical Implant Lead Wires, Department of Engineering, The University of Waikato, 7 pages.

\* cited by examiner

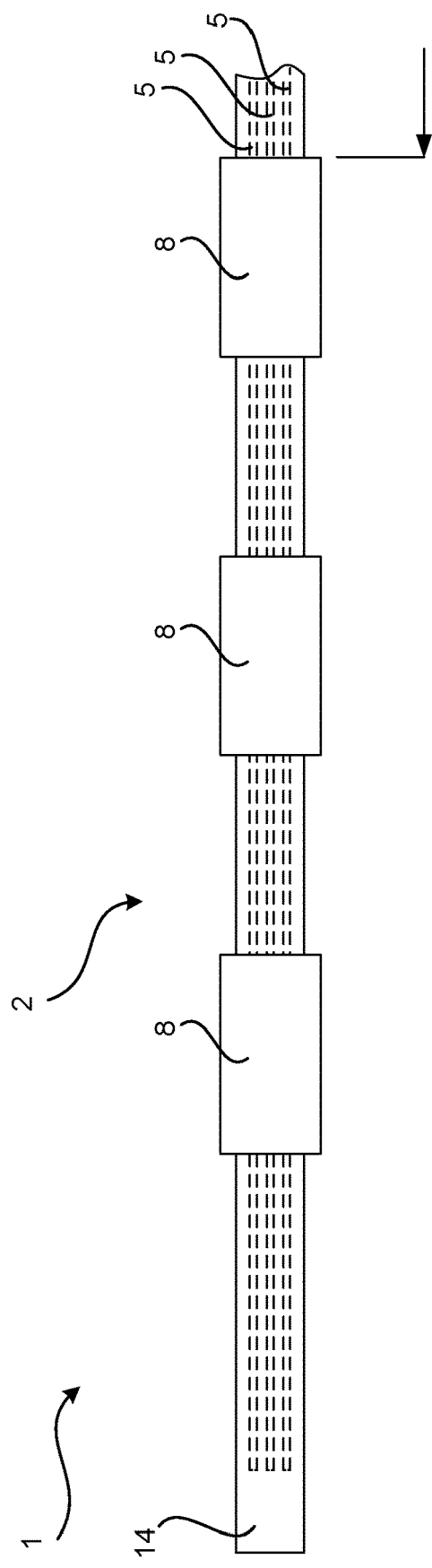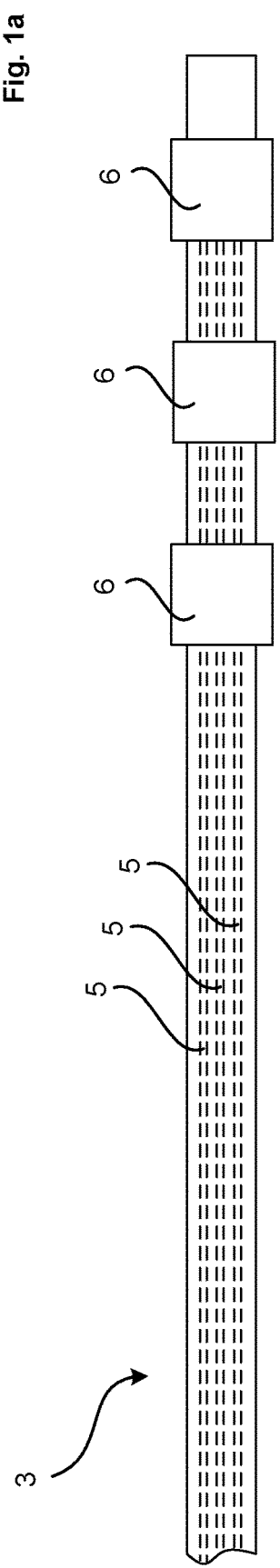

CIRCUIT FOR A LEAD OF AN
IMPLANTABLE MEDICAL DEVICE

CROSS-REFERENCE TO RELATED
APPLICATIONS

The present application claims priority from Australian Provisional Patent Application No 2019903743 filed on 4 Oct. 2019, the contents of which are incorporated herein by reference in their entirety.

TECHNICAL FIELD

The present disclosure relates to an electric circuit for an implantable medical device (IMD) for implanting into tissue of a patient.

BACKGROUND

Medical devices having one or more active implantable components, generally referred to herein as active implantable medical devices (AIMDs), have provided a wide range of therapeutic benefits to patients over recent decades. AIMDs often include an implantable, hermetically sealed electronics module, and a device that interfaces with a patient's tissue, sometimes referred to as a tissue interface. The tissue interface may include, for example, one or more instruments, apparatus, sensors or other functional components that are permanently or temporarily implanted in a patient. The tissue interface is used to, for example, diagnose, monitor, and/or treat a disease or injury, or to modify a patient's anatomy or physiological process.

In particular applications, an AIMD tissue interface includes one or more conductive electrical contacts, referred to as electrodes, which deliver electrical stimulation signals to, or receive signals from, a patient's tissue. The electrodes are typically disposed in a biocompatible electrically non-conductive member, and are electrically connected to the electronics module. The electrodes and the non-conductive member are collectively referred to herein as an electrode assembly.

FIGS. 1a and 1b illustrate a stimulating lead 1 for neuro-stimulation, which delivers electrical pulses to a specific nerve or tissue. This lead 1 consists of a distal end 2 (also referred to as therapeutic end) shown in FIG. 1a and of a proximal end 3 (also referred to as connector end) shown in FIG. 1b. Lead 1 further comprises a long thin non-conductive (and insulating) body 14 and a number of conductive rings 8 at therapeutic end 2 and a number of conductive rings 6 at proximal end 3. The rings 8 at therapeutic end 2 are known as electrodes and the rings 6 at the connector end 3 are known as contacts, where the electrodes are connected to an implantable pulse generator (IPG). An example of the long thin non-conductive body 1004 is shown in the cross-section in FIG. 2 that shows conductive filaments 5 surrounded by a non-conductive body 14. Each ring 6 at connector end 3 is electrically connected to exactly one filament 5, which, in turn, is electrically connected to exactly one electrode 8 at therapeutic end 2 such that a one-to-one connection is established between the rings.

Patients with an implanted neuro-stimulator and associated lead may have issues undergoing magnetic resonance imaging (MRI). The MRI uses three types of fields to create an image: a static magnetic field; a radiofrequency (RF) magnetic field; and a gradient magnetic field. Exposure to these fields may cause heating to the leads. This heating may result in tissue burns and damage (which may not be immediately felt by the patient). Another potentially damaging effect is damage to the implant due to radiofrequency energy being transmitted from the lead. This can lead to reprogramming, damage to the implant or explant of the implant. Additionally, the MRI could cause a temporary unintended stimulation due to induced voltage through the assembly and system.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

There have been attempts to provide designs for MRI safe leads. US patent publication U.S. Pat. No. 8,798,767 B2 illustrates a method of reducing the heat caused by MRI conditions. This document suggests coiling conductors in a multi-layer structure, with each coil layer electrically connected to the next to provide parallel conductive paths. However, this method may result in high inductance when exposed to MRI radiation. US patent publication U.S. Pat. No. 9,050,457 B2 uses a similar approach with a lead body and multi-layer coil conductor within the length of the lead body. The stiffness of the multi-layer coil conductor is similar to the lead body, ensuring consistent mechanical properties of the lead. US patent publication U.S. Pat. No. 9,302,101 B2 uses a different approach with the lead body providing an additional path for containing conductive material. This path spans at least a section of the length of the lead for conducting the induced RF energy away from the conductive wire of the lead.

In light of the above mentioned issues, it would be advantageous to have an electrode assembly, such as one used in an implantable medical device, that may be implanted in a patient whilst the patient is undergoing magnetic resonance imaging. This may include providing an implantable electrode assembly which, when exposed to an MRI environment, does not generate significant heat in the leads due to electromagnetic currents. In may be further advantageous for an implantable medical device that can operate during magnetic resonance imaging without, or with reduced, side effects described above.

An implantable electric circuit (300) for medical stimulation comprise a plurality of capacitors (301) and a network of resistors (302). Each of the plurality of capacitors (301) is configured to couple radio frequency energy from one of a plurality of electrically conductive filaments (5) of a lead to the network of resistors (302). The network of resistors (302) is configured to connect the plurality of capacitors (301) together to dissipate the radio frequency energy between the plurality of electrically conductive filaments.

The network of resistors dissipates the energy between the filaments, which reduces negative impacts for the patient when subjected to MRI imaging. Further, no ground is required and as a result, the circuit can be placed into a header of an implantable pulse generator or into the lead itself.

In some examples, the network of resistors is electrically floating.

In some examples, the filaments of the lead are arranged annularly within a multi lumen conductor and the network of resistors comprises one resistor between adjacent filaments to thereby form a ring of resistors capacitively coupled to the electrically conductive filaments.

In some examples, resistance values of the network of resistors are set to match a real part of an impedance of the filaments.

In some examples, capacitance values of the plurality of capacitors is set such that the capacitors constitute high pass filters with respective cut-off frequencies between a stimulation frequency and the radio frequency.

In some examples, there is exactly one capacitor for each filament, and the exactly one capacitor is connected in series between the filament and the resistor network.

In some examples, the implantable electric circuit is located within a housing of an implantable medical device.

In some examples, the circuit is integrated within the lead.

In some examples, resistor values of the network of resistors are based on a position along the lead where the network of resistors is connected to the filaments.

In some examples, the plurality of capacitors are formed as longitudinal extensions of the filaments.

In some examples, each of the plurality of electrically conductive filaments constitutes a first plate of the capacitor which couples that filament to the network of resistors.

In some examples, each of the capacitors comprise a dielectric material that has a cross-section corresponding to a cross-section of the electrically conductive filament.

In some examples, the implantable electric circuit is integrated within the lead at a position where a maximum differential voltage occurs during magnetic resonance imaging.

A method of manufacturing an implantable electric circuit (300) for medical stimulation comprises connecting a plurality of capacitors (301) to a network of resistors (302) to form the implantable electric circuit. Each of the plurality of capacitors (301) is configured to couple radio frequency energy from one of a plurality of electrically conductive filaments (5) of a lead to the network of resistors (302). The network of resistors (302) is configured to connect the plurality of capacitors (301) together to dissipate the radio frequency energy between the plurality of electrically conductive filaments.

BRIEF DESCRIPTION OF DRAWINGS

FIGS. 1a and 1b illustrate a stimulating lead according to the prior art.

Figure 3:
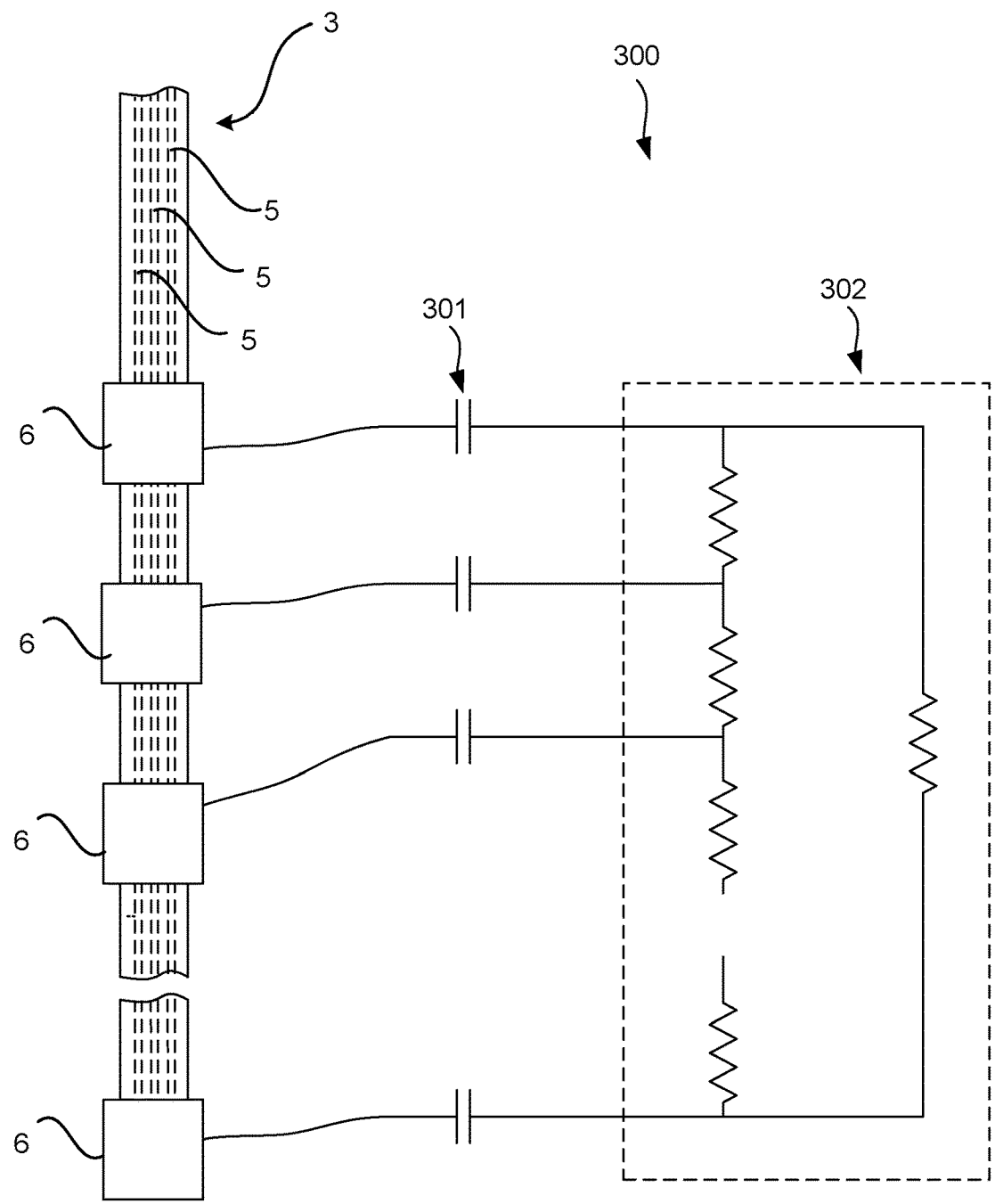

An example will be described with reference to the following drawings:

FIG. 3 illustrates the connector end of a stimulation lead where the filaments are connected to an implantable electric circuit.

Figure 4:
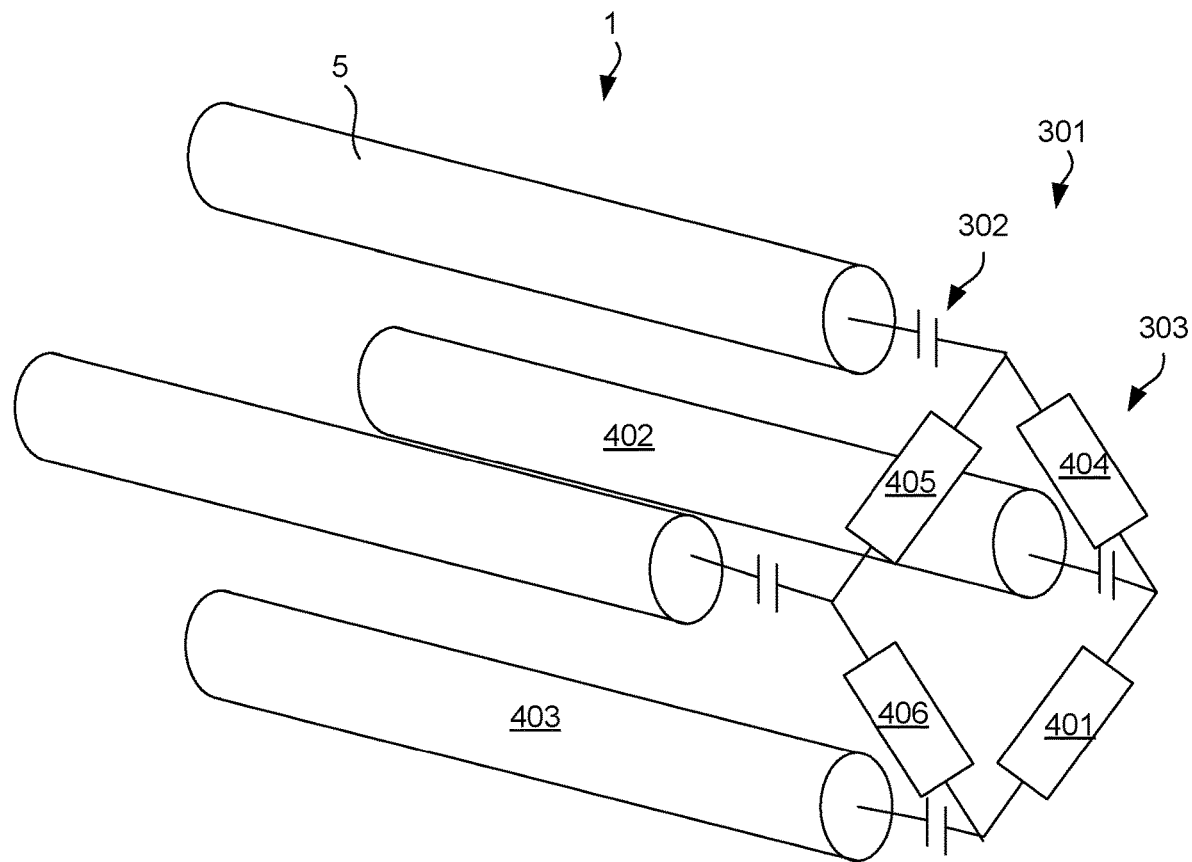

FIG. 4 illustrates a ring of resistors capacitively coupled to filaments.

Figure 5A:
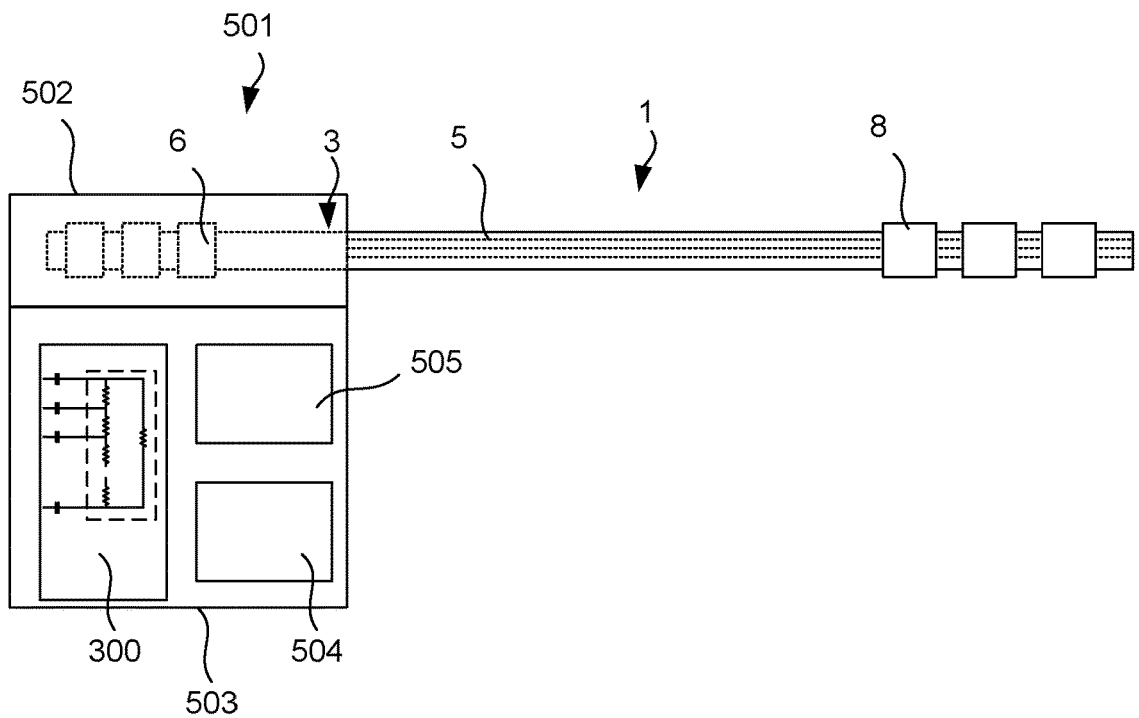

FIG. 5a illustrates an example active implantable medical device with an inserted stimulation lead.

Figure 5B:
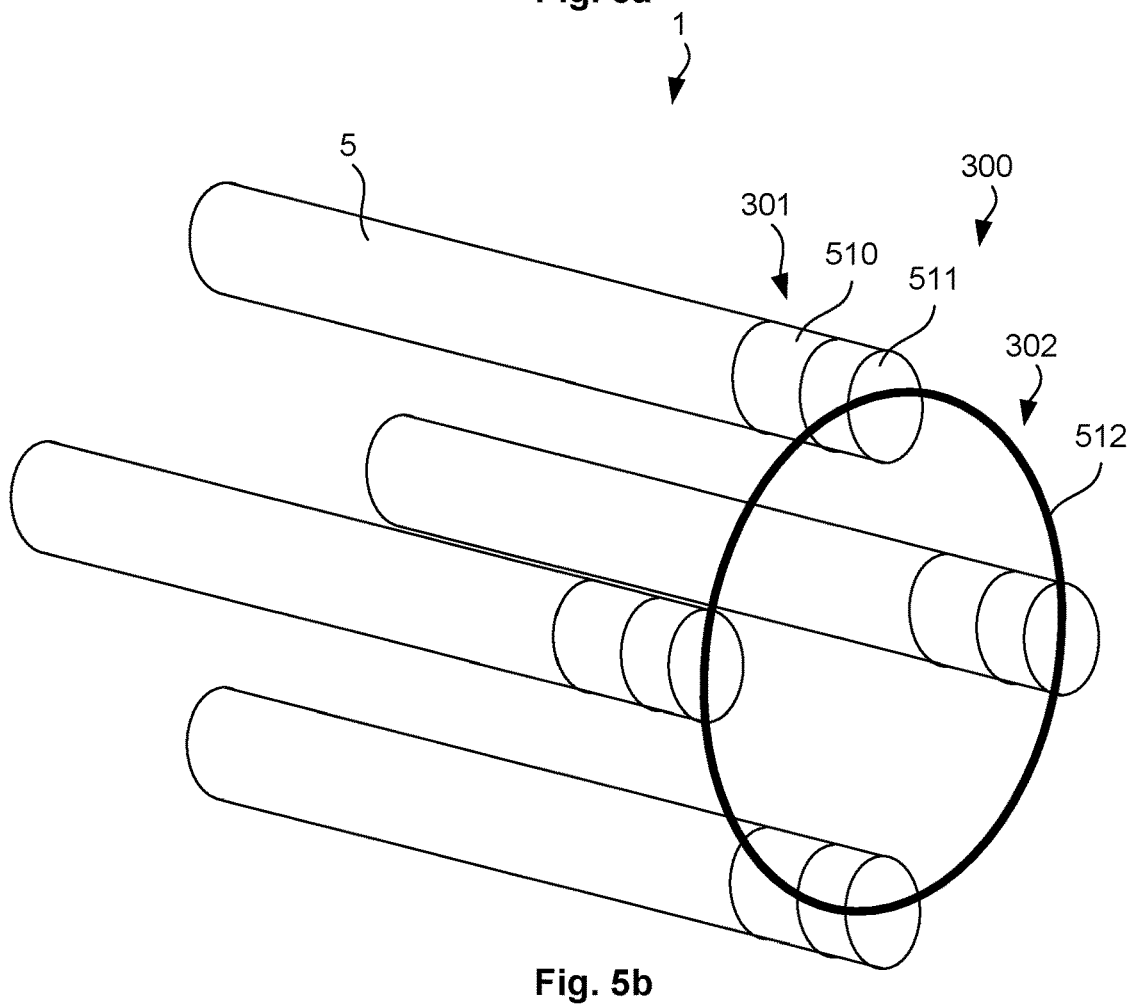

FIG. 5b illustrates a further example, where the implantable electric circuit is integrated within the stimulation lead.

Figure 6A:
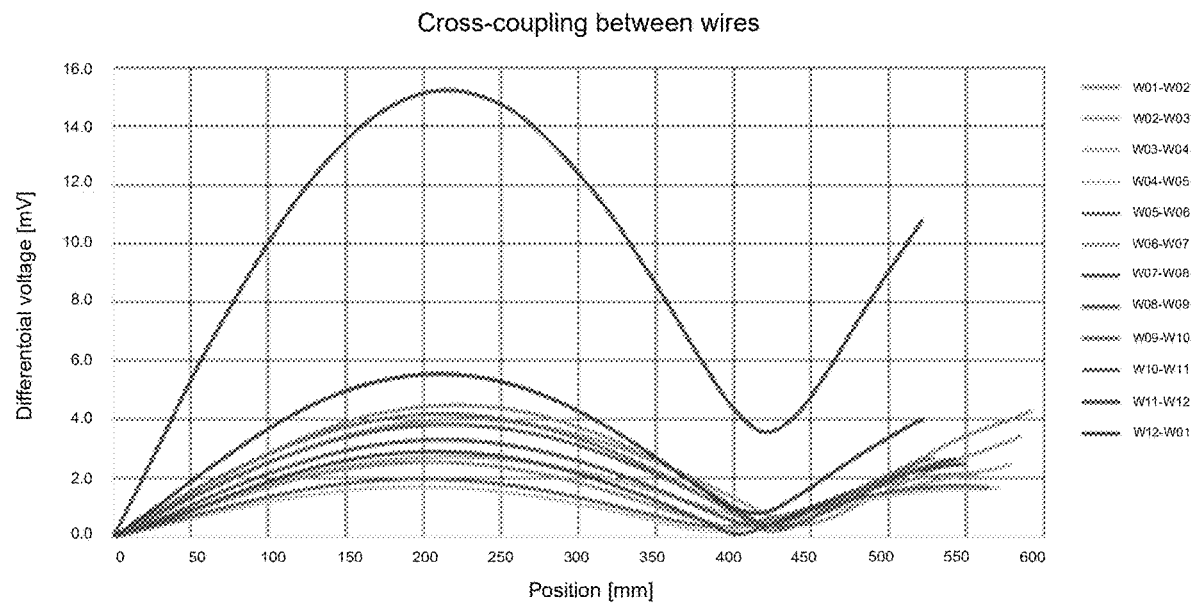

FIG. 6a illustrates differential voltage between lead wires without a dissipation circuit.

Figure 6B:
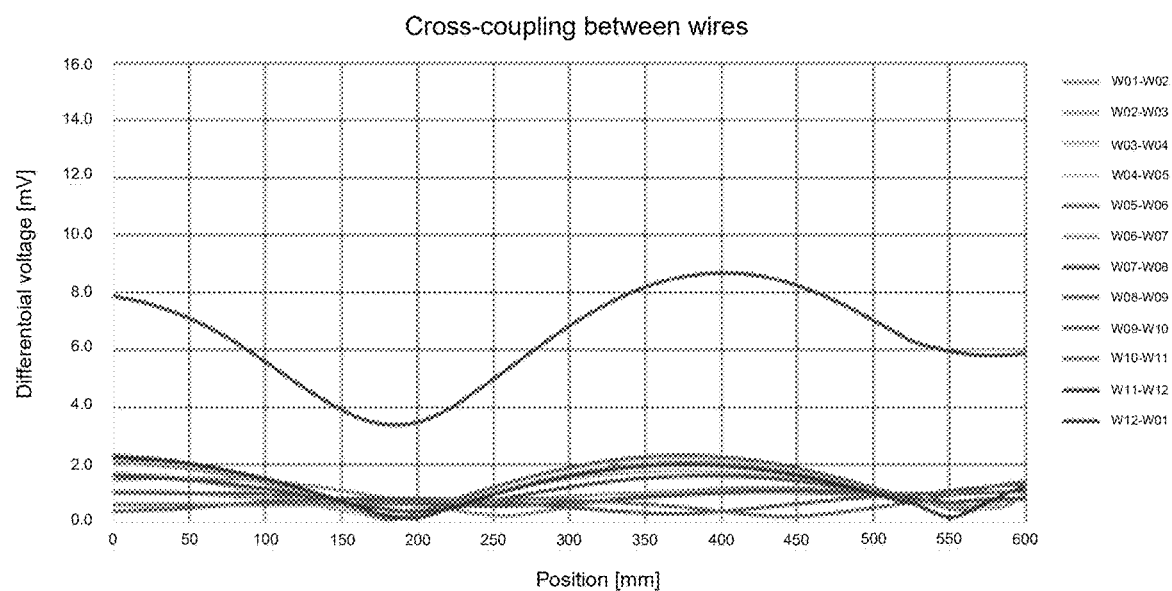

FIG. 6b illustrates differential voltage between lead wires with ring of 100 Ohm resistors in the IPG header.

DESCRIPTION OF EMBODIMENTS

Aspects of the present disclosure are generally directed to an electric circuit for use with an active implantable medical device (AIMD). An AIMD may include an implantable electronics module and a tissue interface. The electrode assembly that, at least in part, forms the tissue interface.

The AIMD may be a neuro stimulator, and more specifically a deep brain stimulator or spinal cord stimulator. Deep brain stimulators are a particular type of AIMD that deliver electrical stimulation to a patient's brain, while spinal cord stimulators deliver electrical stimulation to a patient's spinal column. As used herein, deep brain stimulators and spinal cord stimulators refer to devices that deliver electrical stimulation alone or in combination with other types of stimulation. It should be appreciated that embodiments of the present disclosure may be implemented in any brain stimulator (deep brain stimulators, cortical stimulators, etc.), spinal cord stimulator or other neuro stimulator now known or later developed, such as cardiac pacemakers/defibrillators, functional electrical stimulators (FES), pain stimulators, etc. Embodiments of the present disclosure may also be implemented in AIMDs that are implanted for a relatively short period of time to address acute conditions, as well in AIMDs that are implanted for a relatively long period of time to address chronic conditions.

The present disclosure is not limited to devices that deliver electrical stimulation signals to a patient. For instance, in certain embodiments, the electrode assembly may be used to receive, record or monitor the physiological response of a patient's tissue to, for example, a therapy. In such embodiments, the electrodes receive a signal from the patient's tissue representing the physiological response. An electrode assembly of the present disclosure that delivers electrical stimulation signals to, or receives signals from, a patient's tissue may also include one or more other components, such as therapeutic agent delivery systems, sensors, etc., that interface with the patient's tissue.

The body 14 is made of biocompatible, electrically non-conductive material that can include thermoplastic polyurethanes (TPUs) such as those under the trade name "pellethane" offered by "The Lubrizol Corporation". In some examples, the body 14 is made from an extrusion of a flexible material with multiple lumens. In some examples, the body 14 and the electrically conductive filaments 5 are mated together with a drawn filled tubing process.

The electrically conductive filaments 5 is preferably selected from a configuration of biocompatible materials. This can include single core or multi strand wires. In another example, this can include a composite of a medical grade alloy, with the trade name "35N LT" offered by Fort Wayne Metals, having a silver core. Other materials may equally be used.

Circuit to Dissipate RF Energy

Figure 2:
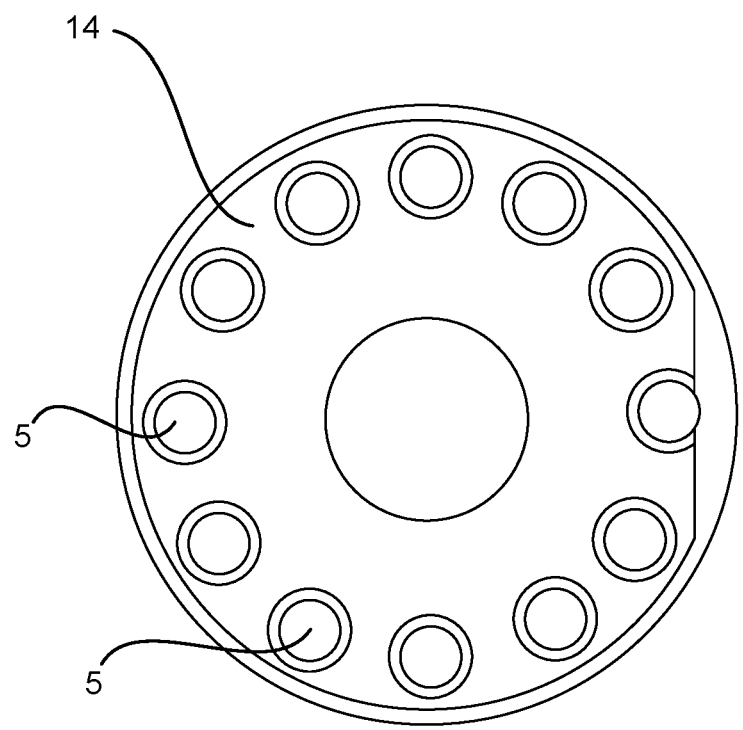
FIG. 2 shows a cross-section of a stimulating lead according to the prior art.

When the lead shown in FIGS. 1a, 1b and 2 is subjected to a changing RF field, such as in an MRI machine, the filaments 5 essentially function as antennas in the sense that the RF field induces a current in filaments 5, which results in heat and potentially harmful overstimulation.

FIG. 3 illustrates again the connector end 3 of lead 1 but this time, the filaments 5 are connected to an implantable electric circuit 300. The circuit 300 comprises a plurality of capacitors 301 and a network of resistors 302. Each of the plurality of capacitors 301 is configured to couple RF energy from one of a plurality of electrically conductive filaments 5 of the lead 1 to the network of resistors 302. The network of resistors 302 is configured to connect the plurality of capacitors 301 together to dissipate the radio frequency energy between the plurality of electrically conductive filaments 5.

The capacitors 301 are configured to couple RF energy from the filament 1 to the resistors 302 due to their frequency filtering characteristics. In other words, capacitors function as high-pass filters that pass the relatively high frequency RF signal through to the resistor network 302 while the relatively low frequency signal that is applied to the filaments during stimulation is blocked such that stimulation energy is not dissipated by the resistors.

The network of resistors 302 dissipates the RF energy between the conductive filaments, which means that the network of resistors 302 dissipates a differential mode between the filaments. For example, if there are only two filaments, an RF field would induce a differential voltage into the two filaments, such that one filament has a positive voltage and the other filament has a negative voltage, for example. The resistor network 302 connects these two filaments via capacitors 302 to dissipate the energy that is represented by the voltage difference between the filaments.

Capacitor and Resistor Values

It is noted that the induced voltage varies at the same frequency as the RF field varies. The frequency may be so high, that the length of the lead 1 becomes comparable to the length of the wavelength of the RF field. For a 64 MHz signal, for example, the wavelength would be about 4 m, which means a quarter wavelength would be about 1 m, which is comparable to typical lead lengths at least in magnitude. The induced RF energy may be maximal when the wave length is a multiple of the lead length, so that for a 0.1 m lead, a half wavelength $$\left(\frac{\lambda}{2}\right)$$

would be 1.5 GHz for maximum (i.e. worst case) 'reception'. In this case, it is possible to choose the value of capacitors 301 such that the coupling is optimal for the resonant frequency.

The cut-off frequency for an RC element can be calculated as $$f_c = \frac{1}{2\pi RC}.$$

Therefore, the capacitor value can be calculated as $$C = \frac{1}{2\pi R f_c}.$$

Assuming a low capacitor value for good dissipation of 10 Ohm at 1.5 GHz, this leads to 10 pF capacitor value. This can be easily re-calculated for other lead lengths and resistor values. It is noted that RF frequencies that do not bring the lead into resonance may not be a concern since the induced energy is significantly less than for the resonant case. Therefore, a single capacitor value may be sufficient. Further, when multiple frequencies are of concern, the capacitor value should be chosen for the lowest RF frequency because all higher frequencies are equally transmitted by the capacitor.

In one example, capacitors present high reactance at frequencies below 100 kHz and low reactance at operating RF frequencies above 100 kHz of the MRI scanner. Typical values are in the range between 30 pF and 300 pF.

Resistors may match the real part of the differential wave impedance of the filaments 5 they are connected to. Typical values are in the range between 30 Ohm and 200 Ohm. Matching the real part of the filament impedance to the resistor value also has the positive effect that reflection of the induced signal from the resistor network is minimised and most of the induced energy is dissipated.

Network Topologies

In some examples, the resistor network 303 is not connected to ground but all resistors are only connected to other filaments. This means the resistor network 303 is electrically 'floating' as it has no defined voltage reference. This has the advantage that the connections are easier to build because no separate wire connection to the common ground plane is required. Also, there is less chance of damaging the pulse generator or other electronics through voltage spikes on a common ground.

It is further noted that the resistor network 303 can have a variety of different topologies, which relates to the connections in the network 303. For example, there may be a star topology where all filaments 5 are connected to a common central point. Of course, the star topology does not need to be routed in a star shape since the actual shape of the connections is not relevant. Rather, the logical topology as the filaments are connected to each other resembles a star structure.

Ring Topology

Similar to the star topology, the resistor network 300 can be connected in a ring topology as shown in FIG. 3. In yet another example, the filaments 5 of the lead are arranged annularly within a multi lumen conductor as shown in FIG. 2. In that case, it is possible that the network of resistors 303 comprises one resistor between adjacent filaments to thereby form a ring of resistors that are capacitively coupled to the electrically conductive filaments 5. This example is illustrated in FIG. 4 where resistor 401 is between adjacent filaments 402 and 403 and forms a ring with resistors 404, 405 and 406 and the ring is capacitively coupled via capacitors 302 to filaments 5. The ring topology of FIG. 4 is implemented in the circuit shown in FIG. 2 assuming that adjacent connectors 6 are connected to respective adjacent filaments 6.

The ring topology has the advantage that the differential mode between two adjacent filaments is optimally dissipated which is useful where the induced energy of the differential mode is most significant between neighbouring filaments. In other words, the resistor ring is useful because each wire couples most closely with the wire besides it. The impedance in the ring matches the wave induced in one wire compared to each of its adjacent ones. The goal is to spread the resonance evenly between the wires and thus there are not individual hot contacts to the same degree.

The physical structure in FIG. 4 is only a depicted for illustrative purposes noting that the network may have a layout that is significantly different to a ring. The actual layout may depend on where the electric circuit 301 is located. In one example, the electric circuit 301 is located within the implantable medical device, such as within the implantable impulse generator. Further, in practical applications, more than four filaments 5 would be used, such as 12 filaments.

Circuit Located within Device

FIG. 5a illustrates the example where circuit 300 is located within an active implantable medical device 501 (AIMD) connected to lead 1. The AIMD device 501 comprises a header 502 and a hermetically sealed housing 503. The proximal end 3 of lead 1 includes the plurality of connectors 6, which are configured to be inserted into the AIMD 501 (into header 502), whereby the connectors 6 are in electrical connection with respective connectors inside the AIMD. In one example, the connectors 6 are configured to be received in medical grade connector/contact systems such as those under the trade name "Bal Conn" offered by "Bal Seal Engineering". The connectors 6 are substantially annular (i.e. ring-shaped) and typically constructed of a biocompatible and electrically conductive material. The annular construction permits good electrical contact with the receiving contact in the AIMD. Suitable material for the connectors 6 may include, but is not limited to, platinum, iridium, other metals, and/or alloys thereof.

The connectors 6 are located separately along the longitudinal axis of the proximal end 6. In FIGS. 1b and 5a, this includes three connectors 6 spaced along the proximal end 6 for illustrative purposes. However, it is to be appreciated that additional connectors 6, for additional channels, can be used. In some examples, this can include up to a dozen or more channels (with a corresponding dozen connectors 6, electrically conductive filaments 5, and electrodes 8). The whole length of the proximal end 6 is typically inserted into the AIMD.

In addition to the connectors 6, the proximal end 6 includes non-conductive part(s) that support the connectors 6. In some examples, this includes the same material, and can be part of, the elongated, biocompatible, electrically non-conductive body 14.

Sealed feed-throughs (not shown) provide an electrical connection between connectors 6 and components within housing 503. In this example, housing 503 houses a battery 504 and stimulation electronics 505, which include electronic circuits to calculate stimulation signals as well as signal drivers, such as current sources to supply stimulation energy from battery 504 to stimulation electrodes 8. In this case, housing 503 also houses the electric circuit 300 described above. Advantageously, the electric circuit 300 can be thermally coupled to the housing 503 such that any dissipated energy can be released relatively gently by way of thermal conduction. It is noted that the wire connections between the electric circuit 300 and the filaments is not shown for clarity but may constitute a ring, star or other network topologies. It is further noted that circuit 300 may also be located elsewhere, such as directly in header 502, as it should be possible to manufacture circuit 300 from biocompatible materials. This configuration has the advantage that the connection between filaments 5 and resistors network 302 is shorter, which may improve coupling to dissipate more of the induced RF energy.

Circuit 300 Integrated within Lead 1

FIG. 5b illustrates a further example, where the implantable electric circuit 300 is integrated within the lead 1. As described above with reference to FIG. 2, the filaments 5 are surrounded by a non-conductive body 14 but this body is not shown in FIG. 5b for clarity. Circuit 300 is integrated within that body in the sense that the circuit 300 is also surrounded by the non-conductive body 14.

In the current example, the plurality of capacitors 301 are formed as longitudinal extensions of the filaments 5. In FIG. 5b one filament 5 is labelled and, as a longitudinal extension, there is a dielectric layer 510 with a cross-section that corresponds to the cross-section of filament 5. In one example, the cross-sections are identical but they may be at an angle to increase the surface area. On top of the dielectric layer 510 there is a metal layer 511 also with a cross-section corresponding to cross-section of filament 5 and dielectric layer 510. In operation, filament 5 and metal layer 511 constitute two capacitor plates with the dielectric layer 510 constituting the insulation layer between the capacitor plates. As a result, the filament 5 constitutes a first plate that couples the filament 5 to the network of resistors 300 and the metal layer 511 constitutes a second plate that couples filament 5 to resistor network 302.

The capacitance of capacitor 301 can be defined by choosing the appropriate values for capacitor plate surface area A, the permittivity $\varepsilon_r$ of the dielectric layer and the distance d, which is the thickness of dielectric layer 510 by $$C = \varepsilon_0 \varepsilon_r \frac{A}{d}$$

($\varepsilon_0$ being the permittivity for air, which is 8.84 $10^{-12}$ F/m).

Since the surface area is set by the cross-section of the filament 5 and the permittivity $\varepsilon_r$ is set by suitable, biocompatible materials, the remaining parameter is the distance d:

$$d = \varepsilon_0 \varepsilon_r \frac{A}{C}.$$

For example, for a cross-section area of 1 mm², permittivity of 10 (glass) and capacitance of 10 pF, the thickness of dielectric layer 510 would be 8.84 μm.

The metal layer 511 is then connected to other metal layers of the other filaments to realise the desired topology of the resistor network 302. FIG. 5b illustrates an example, where a resistance wire 512 directly connects the metal layers 511. Resistance wire 512 effectively constitutes a resistor between each filament 5. The resistance depends on the length of the wire but since the distance between each filament 5 is identical, the resistance between each filament 5 is also identical. The resistance can be adjusted by choosing the diameter of wire 512 and material (i.e. conductance) of wire 512.

In yet a further example, the capacitors 310 are not connected to one of the ends of lead 1, but at a position along the lead. This can be realised either with discrete capacitors connected to the filaments 5 at a location along the lead or by forming an integral T stud on filament 5 at a position along the filament and then manufacturing the capacitor at the end of the T-stud in a similar manner as shown in FIG. 5b using dielectric and metal layers with corresponding cross sections. The position along the filament can be chosen depending on the requirements. For example, if a λ/2 standing wave (i.e. the filament length is half the wavelength) is to be dissipated, the circuit 300 can be integrated within the lead at a position where a maximum differential voltage occurs during magnetic resonance imaging, which may be at exactly half way between both ends of the filament 5.

By changing the position of coupling network 302 to filaments 5 along the length of the filaments, this also changes the impedance of the filament. This means that the resistor values can be adjusted to match the changed impedance, which means the resistor values of the network of resistors 302 are based on a position along the lead where the network of resistors is connected to the filaments.

Filters

While single capacitors have been described above, it is equally envisaged that the circuit 300 can have more elaborate coupling circuits, which effectively function as filters that pass the signal to be dissipated. In this sense, multiple capacitors may form a filter especially for cases where the stimulation and RF frequencies are close to each other as multiple capacitors can provide a steeper filter response. Example filters include Butterworth, Chebyshev and Elliptical filters. With a steeper filter response, it may be possible to locate the filter in the spectrum further away from the stimulation signal, which may preserve pulse forms since rectangular stimulation pulses generally include high frequencies, so placing the filter further away from the stimulation frequency in the spectrum, may prevent 'rounding' or 'blurring' the stimulation pulses and reduce waste of stimulation energy.

Test Data

FIG. 6a illustrates differential voltage between lead wires without circuit 300. FIG. 6b illustrates differential voltage between lead wires with ring of 100 Ohm resistors in the IPG header 502. As can be seen very clearly, the overall amplitude of the induced differential voltage along the filaments 5 has been reduced significantly, which shows the effectiveness of the proposed solution. That is, FIG. 6b shows that RF energy between filaments has been dissipated by the resistor network 302, which would then reduce heating and potential overstimulation.

In both scenarios (i.e. with and without the circuit 300), a plane electromagnetic wave with an axiolateral electric field of 1V/m at 128 MHz was used to excite the filament. The leads and AIMD (in the form of an implanted pulse generator) were embedded in a gelled saline solution to simulate tissue.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An implantable electric circuit for medical stimulation, the circuit comprising:
   a plurality of capacitors; and
   a network of resistors, wherein
   each of the plurality of capacitors is configured to couple radio frequency energy from one of a plurality of electrically conductive filaments of a lead to the network of resistors, and
   the network of resistors is configured to connect the plurality of capacitors together to dissipate the radio frequency energy between the plurality of electrically conductive filaments, wherein the filaments of the lead are arranged annularly within a multi lumen conductor and the network of resistors comprises one resistor between adjacent filaments to thereby form a ring of resistors capacitively coupled to the electrically conductive filaments, and
   wherein the circuit is integrated within the lead.

2. The implantable electric circuit of claim 1, wherein the network of resistors is electrically floating.

3. The implantable electric circuit of claim 1, wherein resistance values of the network of resistors are set to match a real part of an impedance of the filaments.

4. The implantable electric circuit of claim 1, wherein capacitance values of the plurality of capacitors is set such that the capacitors constitute high pass filters with respective cut-off frequencies between a stimulation frequency and the radio frequency.

5. The implantable electric circuit of claim 1, wherein there is exactly one capacitor for each filament, and the exactly one capacitor is connected in series between the filament and the resistor network.

6. The implantable electric circuit of claim 1, wherein the implantable electric circuit is located within a housing of an implantable medical device.

7. The implantable electric circuit of claim 1, wherein resistor values of the network of resistors are based on a position along the lead where the network of resistors is connected to the filaments.

8. The implantable electric circuit of claim 1, wherein the plurality of capacitors are formed as longitudinal extensions of the filaments.

9. The implantable electric circuit of claim 8, wherein each of the plurality of electrically conductive filaments constitutes a first plate of the capacitor which couples that filament to the network of resistors.

10. The implantable electric circuit of claim 1, wherein each of the capacitors comprise a dielectric material that has a cross-section corresponding to a cross-section of the electrically conductive filament.

11. The implantable electric circuit of claim 1, wherein the implantable electric circuit is integrated within the lead at a position where a maximum differential voltage occurs during magnetic resonance imaging.

12. A method of manufacturing an implantable electric circuit for medical stimulation, the method comprising:
   connecting a plurality of capacitors to a network of resistors, wherein
   each of the plurality of capacitors is configured to couple radio frequency energy from one of a plurality of electrically conductive filaments of a lead to the network of resistors, and
   the network of resistors is configured to connect the plurality of capacitors together to dissipate the radio frequency energy between the plurality of electrically conductive filaments, wherein the filaments of the lead are arranged annularly within a multi lumen conductor and the network of resistors comprises one resistor between adjacent filaments to thereby form a ring of resistors capacitively coupled to the electrically conductive filaments and
   wherein the circuit is integrated within the lead.

13. An implantable electric circuit for medical stimulation, the circuit comprising:
   a plurality of capacitors; and
   a network of resistors, wherein
   each of the plurality of capacitors is configured to couple radio frequency energy from one of a plurality of electrically conductive filaments of a lead to the network of resistors, and
   the network of resistors is configured to connect the plurality of capacitors together to dissipate the radio frequency energy between the plurality of electrically conductive filaments, wherein the filaments of the lead are arranged annularly and the network of resistors comprises one resistor between adjacent filaments to thereby form a ring of resistors capacitively coupled to the electrically conductive filaments, and
wherein the network of resistors is electrically floating.

\* \* \* \* \*